P. E. NELSON.
CHAIN LINK.
APPLICATION FILED NOV. 14, 1917.

1,269,733.

Patented June 18, 1918.

WITNESSES

INVENTOR
Peter E. Nelson
By
ATTORNEY

UNITED STATES PATENT OFFICE.

PETER E. NELSON, OF LUVERNE, NORTH DAKOTA.

CHAIN-LINK.

1,269,733.　　　　Specification of Letters Patent.　　Patented June 18, 1918.

Application filed November 14, 1917. Serial No. 201,987.

*To all whom it may concern:*

Be it known that I, PETER E. NELSON, a citizen of the United States, residing at Luverne, in the county of Steele and State of North Dakota, have invented certain new and useful Improvements in Chain-Links, of which the following is a specification.

This invention relates to certain new and useful improvements in chain links.

The principal object of the invention is to provide a detachable link which may be used to secure together the separated sections of a broken link, this detachable link being readily applied in place of the broken link. This link also making it possible to temporarily increase the length of any chain by coupling therewith additional sections, the detachable link serving as a coupling medium.

Another object of the invention is to provide a link of this character which is sufficiently strong to withstand the necessary strain and is capable of being readily applied or removed.

Other objects as well as the specific arrangement and operation of the several parts of the invention will be more readily appreciated from the following description and accompanying drawings in which drawings:—

Figure 1:
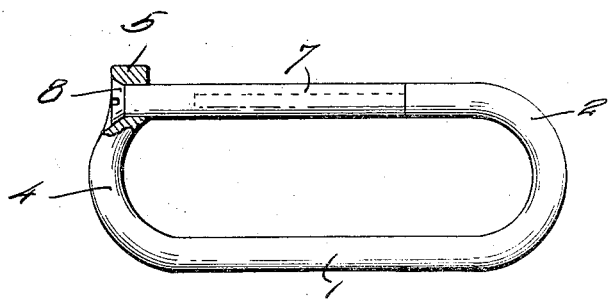
Figure 1 is a side elevation of my improved link.
Figure 2:
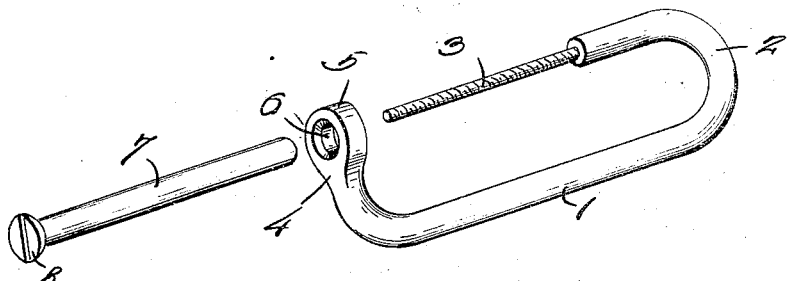
Fig. 2 is a perspective view of the link with the locking member removed.

In the drawings wherein I have shown a preferred embodiment of the invention the numeral 1 designates a bar provided with a reversely curved end 2, from which projects an elongated threaded extension 3. This extension 3 as shown extends in spaced parallelism with the main portion of the bar 1. The opposite end 4 of the bar is bent at right angles in the same plane with the curved end 2 and terminates in an enlarged head 5. This enlarged head 5 is provided with an opening 6, countersunk at its outer end, and the longitudinal center of this opening is alined with the extension 3.

A threaded sleeve indicated at 7 is adapted to be passed through the opening 6 and is provided with an interiorly threaded bore to receive the threaded extension 3 as clearly shown by the dotted lines in Fig. 1. The outer end of this sleeve is provided with a slotted head 8 which is received in the countersunk outer face of the end 4 of the bar when the device is assembled as in Fig. 1.

It will be noted that a space exists between the end of the extension 3 and the end 4 of the link, and in using this link the ends of the two chain sections to be connected are engaged with the opposite ends of this link through the space mentioned and the threaded sleeve 8 is then engaged with the extension through the opening 6 in the manner described and thus effectually prevents the chain sections from becoming disengaged with the detachable link.

From the foregoing it is thought that the operation and construction of this link is clear and it should be further appreciated that this improved link provides a very efficient coupling for the purpose of securing together broken sections of a chain. Furthermore by the use of this link the length of any chain can be temporarily increased by adding one or more sections thereto and using the detachable link as a coupling between the various sections.

What I claim is:—

1. A bar bent to form a link and having an opening in one end thereof the opposite end of the bar having a portion screwthreaded and arranged in longitudinal alinement with said opening, and a fastening member adapted to be passed through the opening and engaged with said extension.

2. A detachable link formed from a bar having one end reversely curved, said curved end terminating in a reduced threaded extension, the opposite end of the bar being bent at right angles and provided with an opening, and a fastening member adapted to be passed through said opening and threadedly engaged with said extension.

3. A detachable link formed from a bar having one end thereof reversely curved, a reduced extension projecting from said curved end, the opposite end of the bar being bent at right angles and provided with an opening, a threaded sleeve adapted to be inserted through the opening for engagement with the extension, and a head formed on said sleeve.

4. A link formed from a bar having one end reversely curved, an extension projecting from said curved end in spaced parallelism with the main portion of the bar, the opposite end of the bar being bent at right angles and provided with an opening in alinement with said extension, said opening having its outer end countersunk, a sleeve adapted to be received in said opening and provided with threaded bore to receive said extension and a head formed on said sleeve and adapted to be received in the countersunk end of the opening.

5. A detachable link comprising a link member having an eye formed in one end thereof, and a freely removable bridge member insertible through said eye for locking engagement with the opposite end thereof.

6. A detachable link comprising a link member having one end thereof reversely curved and having its opposite end bent at right angles and provided with an eye and a removable bridge member slidable through said eye for locking engagement with said reversely curved end.

In testimony whereof I affix my signature in presence of two witnesses.

PETER E. NELSON.

Witnesses:
W. B. Cheshire,
R. W. Smithberger.

Copies of this patent may be obtained for five cents each, by addressing the "Commissioner of Patents, Washington, D. C."